United States Patent [19]

Osawa

[11] Patent Number: 5,072,106
[45] Date of Patent: Dec. 10, 1991

[54] SOLAR RADIATION QUANTITY DETECTING DEVICE FOR AUTOMOBILE AIR-CONDITIONER

[75] Inventor: Takashi Osawa, Konan, Japan
[73] Assignee: Zexel Corporation, Tokyo, Japan
[21] Appl. No.: 587,803
[22] Filed: Sep. 25, 1990
[51] Int. Cl.$^5$ .......................... G01J 00/00; H01J 40/14
[52] U.S. Cl. .................................. 250/206.1; 98/2.01; 454/75; 454/900
[58] Field of Search ............... 250/203.4, 206.1, 206.2, 250/208.2, 208.6; 98/2.01; 165/42; 236/91 C

[56] References Cited

U.S. PATENT DOCUMENTS

4,760,772  8/1988  Horiguchi et al. ............... 250/206.1
4,961,462 10/1990  Iida et al. ............................. 98/2.01
5,020,424  6/1991  Iida et al. ............................. 165/42

Primary Examiner—David C. Nelms
Assistant Examiner—John R. Lee
Attorney, Agent, or Firm—Wenderoth, Lind & Ponack

[57] ABSTRACT

A device for detecting the solar radiation quantity of the sunlight coming in the passenger compartment of an automobile is construct to correct a solar radiation quantity by adding an amount of correction to the solar radiation quantity obtained based on the composite of plural detected values from a solar radiation sensor when the direction of the sunlight is deviated from the direction of travel of the automobile beyond a prescribed range, whereby the solar radiation quantity used for the control of an automobile air-conditioner is prevented from being lowered in case of deviated solar radiation. The solar radiation quantity coming into a rear portion of the passenger compartment is detected and compared with the front solar radiation quantity. A larger one of the front and rear solar radiation quantities is used as a solar radiation quantity for the control of the automobile air-conditioner to cope with the solar radiation coming from every direction relative to the direction of travel of the automobile.

10 Claims, 6 Drawing Sheets

AZIMUTH OF THE SUN ($\alpha°$)

FIG. 12

SOLAR RADIATION QUANTITY DETECTING DEVICE FOR AUTOMOBILE AIR-CONDITIONER

BACKGROUND OF THE INVENTION

1. Field of the Invention

The present invention relates to determination of the quantity of solar radiation of the sunlight coming into the passenger compartment of an automobile particularly when the azimuth of the sun is deviated from the direction of movement of the automobile. More particularly, the invention concerns a solar radiation quantity detecting device for use in an automobile air-conditioner.

2. Description of the Prior Art

There have been proposed control systems comprising a plurality of solar radiation sensors disposed on predetermined portions of the passenger compartment of an automobile, such as front and rear portions of the passenger compartment to be air-conditioned, for adequately controlling the air-conditioning of the front and rear portions depending on the detected signals from respective sensors. The proposed control system having such plural solar radiation sensors needs a number of electric wirings and hence a complicated signal processing system. With this difficulty in view, a simple control system is disclosed in Japanese Patent Laid-open Publication No. 62-73108, wherein a solar radiating condition detecting device composed of a plurality of solar radiation sensors is disposed on one portion of a passenger compartment. The disclosed solar radiating condition detecting device is aimed at an accurate detection of the current solar radiating condition and includes a solar radiating intensity and direction detecting unit composed of at least three solar radiation intensity detecting elements each for detecting the intensity of solar radiation impinging thereon and means for detecting the intensity and direction of solar radiation based on the intensity of solar radiation detected by each detecting element, and a solar radiating condition calculating unit for calculating the solar radiating condition of a selected portion of the passenger compartment based on the intensity and direction of solar radiation detected by the solar radiating intensity and direction detecting unit.

In this known control system, when the so-called "deviated solar radiation" exists, the quantity of solar radiation detected by the solar radiation sensors is considerably lowered under the influence of the windshield and the rear window of the automobile, in spite of the fact that the solar radiation quantity in this instance is substantially the same as the solar radiation quantity detected when the sunlight comes from the front of the automobile into the passenger compartment. Furthermore, the control system is unable to detect the solar radiation quantity when the sunlight comes rearward from the automobile. If the deviated solar radiation is corrected depending upon the detected solar radiation quantity, the amount of correction is smaller than should be performed in view of the actual solar radiation quantity. The term "deviated solar radiation" used herein is intended to refer to the condition where the direction of solar radiation, i.e. the azimuth of the sun is in the range of $+60° < \alpha < +180°$ and $-60° < \alpha < -180°$, for example.

SUMMARY OF THE INVENTION

With the foregoing difficulties in view, it is an object of the present invention to provide a solar radiation quantity detecting device for used in an automobile air-conditioner, which composes a plurality of detected values from a solar radiation detecting means and adds to the resultant solar radiation quantity a correction to obtain a corrected solar radiation quantity when the azimuth of the sun is deviated beyond a predetermined range, thus avoiding insufficient correction of the solar radiation at the time of deviated solar radiation.

Another object of the present invention is to provide a solar radiation quantity detecting device which is capable of correcting the solar radiation quantity in adequate manner as the direction of solar radiation changes from the front to either side of an automobile, thereby enabling a stable control of the air-conditioning operation regardless of the direction of solar radiation which provides a comfortable air-conditioning feeling.

A further object of the present invention is to provide a solar radiation quantity detecting device including a photoelectric transducer element disposed on a rear portion of the passenger compartment for detecting the solar radiation quantity at the rear portion separately from the solar radiation quantity at the front seat portion, so that a larger one of the front and rear solar radiation quantities is adopted as a controlling solar radiation quantity for producing a solar radiation signal indicative of the solar radiation quantity of the sunlight coming from every direction of the automobile.

According to a first aspect of the present invention, there is provided a device for detecting the quantity of solar radiation for use in an automobile air-conditioner, comprising: solar radiation quantity detecting means including at least two photoelectric transducer elements for detecting quantities of solar radiation coming into a passenger compartment of an automobile; solar radiating direction signal calculating means for calculating a solar radiating direction signal based on a plurality of detected values from the solar radiation quantity detecting means; deviated solar radiation judgment means for judging of the solar radiating direction signal from the solar radiating direction signal calculating means to be exceeding a predetermined level; and solar radiation quantity calculating means for calculating a solar radiating quantity based on a first solar radiation quantity characteristic determined based on the composite of the plurality of detected signals from the solar radiation quantity detecting means when the judgment of the deviated solar radiation judgment means indicates the absence of a deviated solar radiation, and for calculating the solar radiating quantity based on a second solar radiation quantity characteristic determined by adding a correction to a solar radiation quantity obtained from the composite of the plurality of detected signals from the solar radiation quantity detecting means when the judgment of the deviated solar radiation judgment means indicates the presence of a deviated solar radiation.

With this construction, when the azimuth of the sun relative to the direction of travel of the automobile exceeds a predetermined range, namely in the event of deviated solar radiation, the solar radiation quantity is corrected by adding an amount of correction to the solar radiation quantity which is obtained based on the composite of plural detected signals from the solar radiation quantity detecting means.

According to a second aspect of the present invention, there is provided a device for detecting the quantity of solar radiation for use in an automobile air-conditioner, comprising: front solar radiation quantity detecting means including at least two photoelectric transducer elements disposed adjacent to the windshield of an automobile for detecting quantities of solar radiation coming into a passenger compartment of an automobile; solar radiating direction signal calculating means for calculating a solar radiating direction signal based on detected values from the front solar radiation quantity detecting means; deviated solar radiation judgment means for judging of the solar radiating direction signal from the solar radiating direction signal calculating means to be exceeding a predetermined level; solar radiation quantity calculating means for calculating a solar radiating quantity based on a first solar radiation quantity characteristic determined based on the composite of a plurality of detected signals from the front solar radiation quantity detecting means when the judgment of the deviated solar radiation judgment means indicates the absence of a deviated solar radiation, and for calculating the solar radiating quantity based on a second solar radiation quantity characteristic determined by adding a correction to a solar radiation quantity obtained from the composite of the plurality of detected signals from the front solar radiation quantity detecting means when the judgment of the deviated solar radiation judgment means indicates the presence of a deviated solar radiation; rear solar radiation quantity detecting means including a photoelectric transducer element disposed adjacent to the rear window of the automobile for detecting the quantity of solar radiation of the sunlight coming into the passenger compartment from the rear side of the automobile; and solar radiation quantity judgment means for comparing the rear side solar radiation quantity from the rear solar radiation quantity detecting means and the front side solar radiation quantity from the front solar radiation quantity detecting means so as to judge a larger one of the front and rear solar radiating quantities to be a solar radiation quantity of the automobile.

With this construction, when the azimuth of the sun relative to the direction of travel of the automobile exceeds a predetermined range, namely in the event of deviated solar radiation, the front solar radiation quantity which is obtained by adding a correction to the solar radiation quantity based on the composition of plurality of detected signals from the front solar radiation quantity detecting means is compared with the rear solar radiation quantity and a larger one of the front and rear solar radiation quantities is adopted as a solar radiation quantity for the control of an automobile air-conditioner.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described hereinbelow in greater detail with reference to certain preferred embodiments shown in the accompanying drawings.

Figure 1:
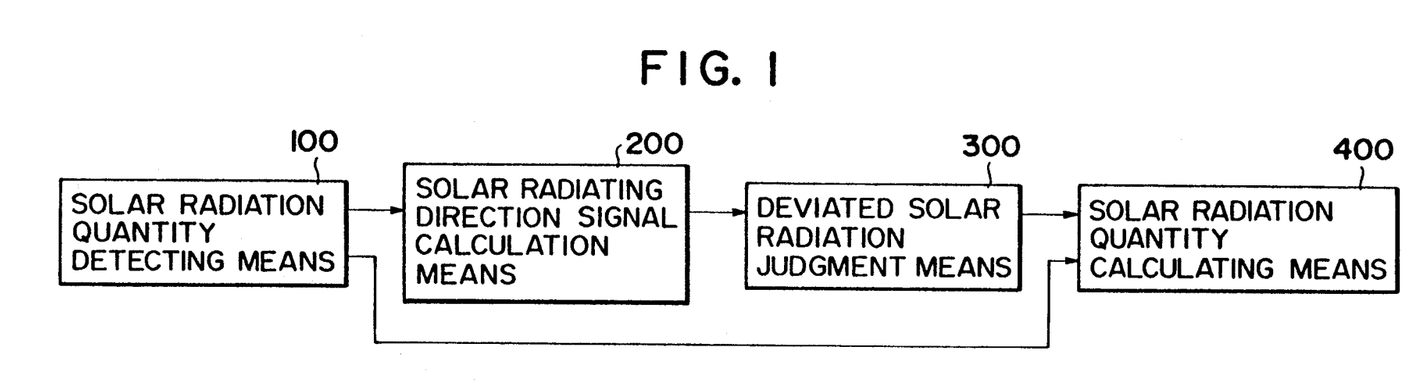
FIG. 1 is a block diagram showing the general construction of a solar radiation quantity detecting device provided according to a first aspect of the present invention.

FIG. 1 shows a solar radiation quantity detecting device provided by a first aspect of the present invention. The device generally comprises solar radiation quantity detecting means 100 including at least two photoelectric transducer elements for detecting quantities of solar radiation coming into a passenger compartment of an automobile, solar radiating direction signal calculation means 200 for calculating a solar radiating direction signal based on a plurality of detected values from the solar radiation quantity detecting means 100, deviated solar radiation judgment means 300 for judging of the solar radiating direction signal from the solar radiating direction signal calculation means 200 to be exceeding a predetermined level, and solar radiation quantity calculating means 400 for calculating a solar radiating quantity based on a first solar radiation quantity characteristic determined based on the composite of the plurality of detected signals from the solar radiation quantity detecting means 100 when the judgment of the deviated solar radiation judgment means 300 indicates the absence of a deviated solar radiation, and for calculating the solar radiating quantity based on a second solar radiation quantity characteristic determined by adding a correction to a solar radiation quantity obtained from the composite of the plurality of detected signals from the solar radiation quantity detecting means 100 when the judgment of the deviated solar radiation judgment means 300 indicates the presence of a deviated solar radiation.

Figure 3:
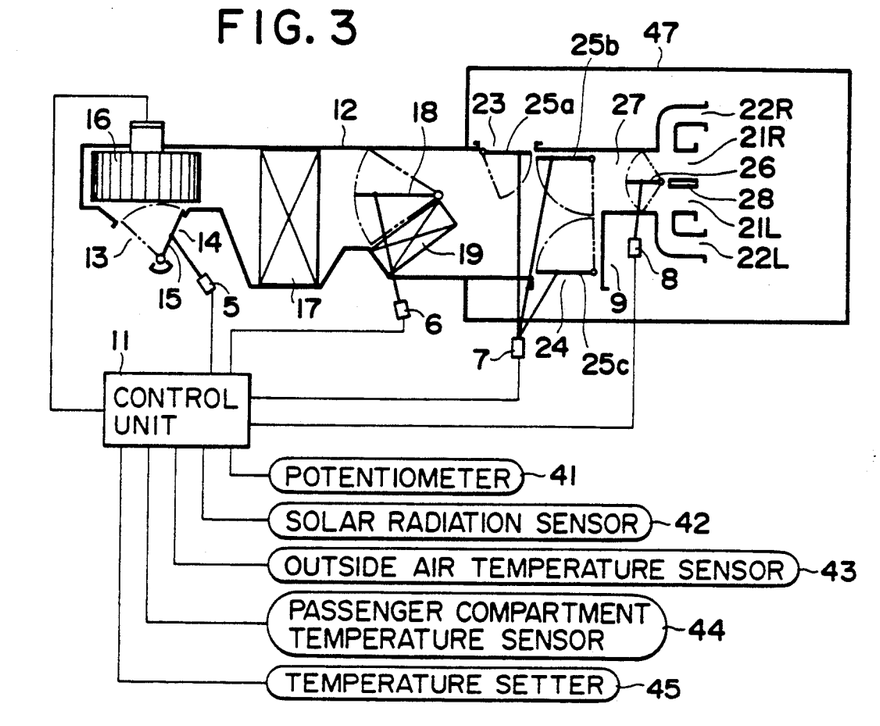
FIG. 3 is a diagrammatical view showing an automobile air-conditioner incorporating the solar radiation quantity detecting device of the present invention.

FIG. 3 diagrammatically shows the solar radiating quantity detecting device incorporated in an automobile air-conditioner. The air-conditioner includes an air-flow duct 12 having an outside air inlet 13 and a recirculating air inlet 14 which are provided in a bifurcated fashion at the upstream end of the air-flow duct 12. A selector door 15 is disposed at the junction between the outside air inlet 13 and the recirculated air inlet 14. The selector door 15 is actuated by an actuator 5 to select the outside air or the recirculated air to be introduced into the air-flow duct 12, so that a desired intake mode is obtained.

A blower 16 is disposed in the air-flow duct 12 adjacent to the air inlets 13, 14 for forcing the air to flow downstream through the air-flow duct 12. The duct 12 also includes an evaporator 17 disposed downstream of the blower 16. The evaporator 17 is connected by piping with a compressor, a condenser, a receiver tank and an expansion valve (neither shown) to jointly constitute a refrigeration system or cycle. The air-flow duct 12 further contains a heater core 19 disposed on a downstream side of the evaporator 17 and an air-mix door 18 disposed at an upstream side of the heater core 19. The angular position of the air-mix door 18, that is, the opening of the air-mix door 18 is regulated by an actuator 6 so that proportions of air flowing through the heater core 19 and air bypassing the heater core 19 are changed to control the temperature of air to be discharged from the air-conditioner.

The air-flow duct 12 has at its downstream end a defroster outlet 23, a vent outlet 27 and a heat outlet 24 that are provided in branched fashion and all open to a vehicle passenger compartment 47. Three mode doors 25a, 25b, 25c are disposed adjacent to the respective outlets 23, 27, 24. The downstream end of the vent outlet 27 includes a right air outlet 22R, a left air outlet 22L, and two central air outlets 21R, 21L that open to right, left and central parts of the passenger compartment 47, respectively. A partition wall or plate 28 is disposed at the junction between these air outlets 22R, 22L, 21R, 21L, and an air-distribution door 26 is disposed in front of the partition plate 28. The mode doors 25a-25c are controlled by an actuator 7 to provide a desired discharge mode, while the air-distribution door 26 is controlled by an actuator 8 to provide a desired air distribution to left and right portions of the passenger compartment 47.

The actuators 5-8 and a motor of the blower 16 are controlled by output signals issued from corresponding driver circuits (not shown) which are connected in circuit with a microcomputer (not shown). The driver circuits and the microcomputer constitute a control unit 11 together with an analog-to-digital (A/D) converter and a multiplexer (neither shown).

A potentiometer 41 for detecting the opening of the air-mix door 41, a solar radiation sensor 42 for detecting quantities of left and right side solar radiation coming into the passenger compartment 47, an outside air temperature sensor 43 for detecting the outside air temperature, a vehicle passenger compartment temperature sensor 44 for detecting the temperature in the vehicle passenger compartment 47, and a temperature setter 45 for setting the temperature in the passenger compartment 47 are provided. Output signals from these components 41-45 are supplied through the multiplexer to the A/D converter in the order selected by the multiplexer. The A/D converter digitizes these signals and supplies them to the control unit 11.

Figure 4:
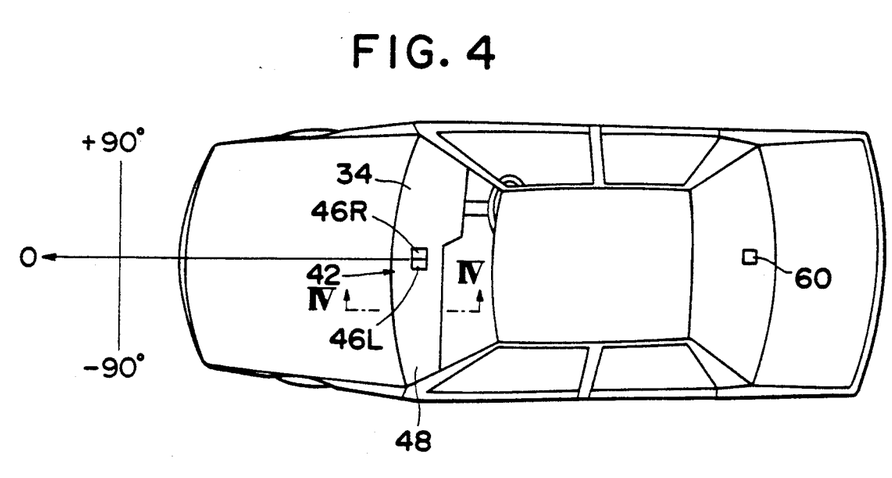
FIG. 4 is a plan view of an automobile in which solar radiation sensors are disposed.
Figure 5:
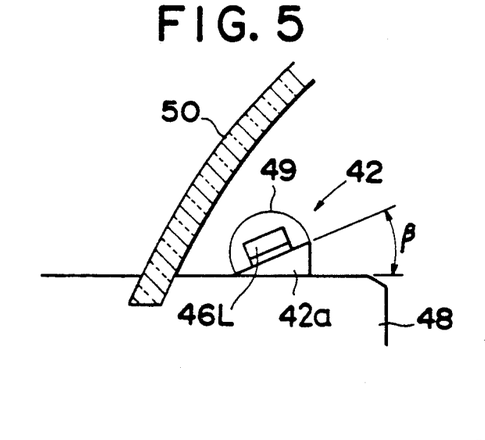
FIG. 5 is a fragmentary side view, partly in cross section of a portion of the automobile including a solar radiation sensor.
Figure 6:
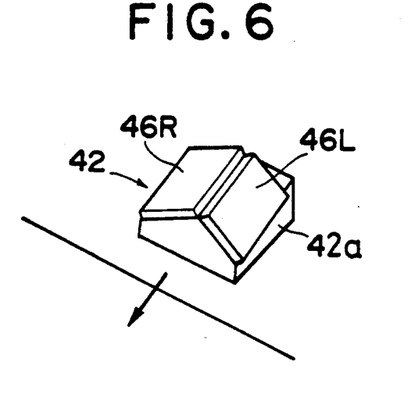
FIG. 6 is a perspective view of the solar radiation sensor shown in FIG. 5.

The solar radiation sensor 42, as shown in FIGS. 4 through 6, is composed of a right light-receiving element 46R and a left light-receiving element 46L which are disposed on two inclined surfaces of a triangular sensor base 42a sloping down to the right and the left, respectively, of the automobile. The solar radiation sensor 42 is disposed on a horizontal upper surface of the instrument panel 48 adjacent to the windshield 50 with the sensor base 42a lying at an angle $\beta$ relative to the upper surface (horizontal plane) of the instrument panel 48, as shown in FIG. 5. The solar radiation sensor 42 is covered with a transparent cover 49. The light-receiving elements 46R, 46L generally comprise photodiodes which convert the quantity of solar radiation into the quantity of electric current.

Figure 8:
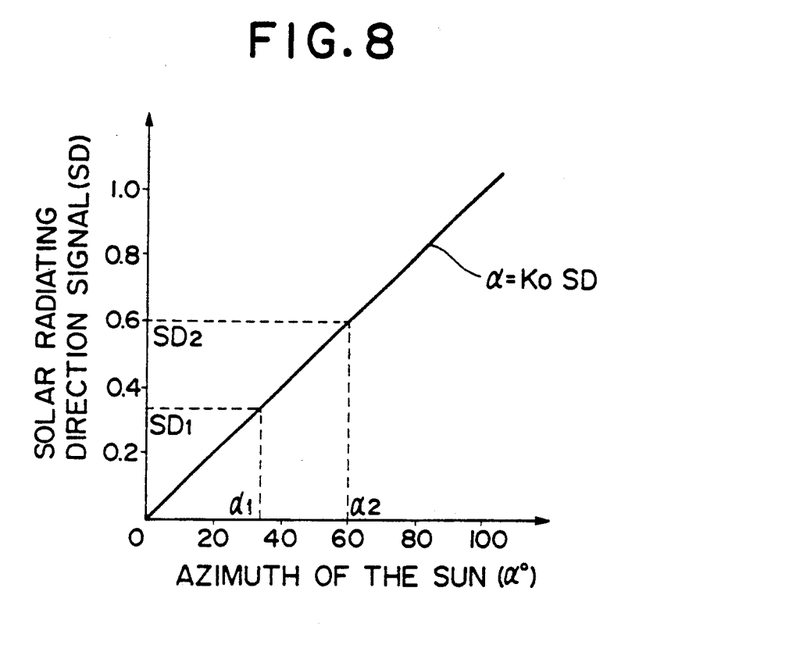
FIG. 8 is a graphical representation of a characteristic curve showing the relationship between the solar radiating direction α and the solar radiating direction signal SD.
Figure 9:
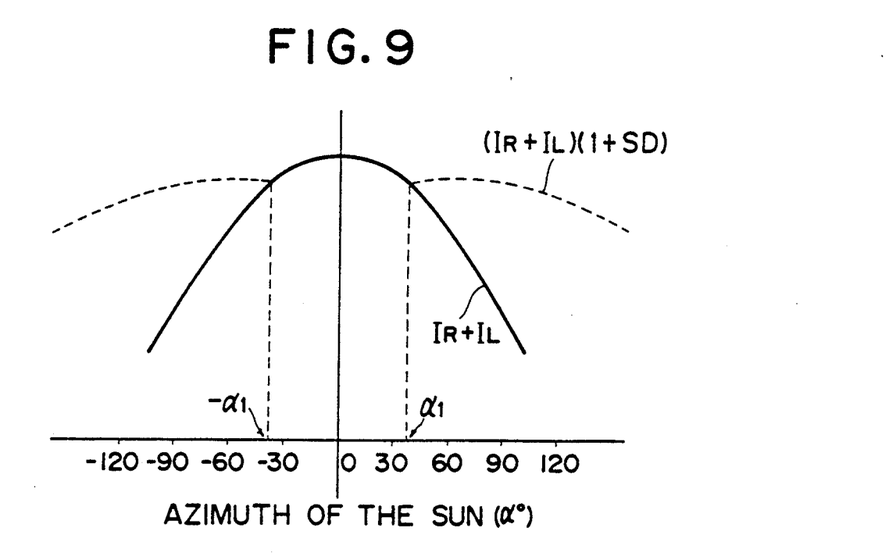
FIG. 9 is a graph showing a first solar radiation quantity characteristic curve.

Operation of the microcomputer incorporated in the control unit 11 will be described below with reference to a flowchart shown in FIG. 7. The flowchart illustrates a control routine achieved for calculating a first solar radiation quantity according to a first aspect of the present invention. A step 51 starts the control routine and in the next following step 52, output signals $I_R$, $I_L$ from the right and left light-receiving elements $46_R$, $46_L$ of the solar radiation sensor 42 are inputted. Subsequently, a step 54 judges to determine as to which of the two output signals $I_R$, $I_L$ is larger. If $I_R - I_L \geq 0$, this means that the output signal $I_R$ from the right light-receiving element $46_R$ is larger than or equal to the output signal $I_L$ of the left light-receiving element $46_L$ (i.e., the solar radiation quantity on the right side of the passenger compartment 47 is larger than or equal to the solar radiation quantity on the left side of the passenger compartment 47). Then, the control advances to a step 56. Conversely, if $I_R - I_L < 0$, this means that the output signal $I_L$ from the left lightreceiving element $46_L$ is larger than the output signal $I_R$ of the right light-receiving element $46_R$ (i.e., the solar radiation quantity on the left side of the passenger compartment 47 is larger than the solar radiation quantity on the right side of the passenger compartment 47). In this case, the control goes on to a step 58. The step 56 calculates the direction of solar radiation. This operation is performed by calculating a solar radiating direction signal SD using an expression $SD = (I_R - I_L)/I_R$. Likewise, the step 58 calculates the solar radiating direction signal SD using an expression $SD = (I_L - I_R)/I_L$. After the step 56 or 58, the control advances to a step 60. The step 60 judges to determine whether the solar radiating direction signal SD is smaller than a predetermined value $SD_1$. The predetermined value $SD_1$, as shown in FIG. 9, is slightly large than an angle of 30 degrees (the azimuth of sun) and is a level from which the $I_R + I_L$ characteristic curve shows a sharp drop. This value $SD_1$ is preset by calculating as shown in FIG. 8.

If the solar radiating direction signal SD is smaller than or equal to the predetermined value $SD_1$ in the step 60, the control advances to a step 62 to obtain the quantity $I_O$ of solar radiation from the $I_R + I_L$ characteristic curve shown in FIG. 9. If the solar radiating direction signal SD exceeds the predetermined value $SD_1$ in the step 60, the control goes on to a step 64 to determine the solar radiation quantity $I_O$ by a characteristic curve which is obtained by multiplying a correction $1 + SD$ by the $I_R + I_L$ characteristic curve. With this correction, a sharp drop of the solar radiating quantity $I_O$ can be avoided even in the event of deviated solar radiation. Thereafter, the control returns from a step 66 to a main routine.

Figure 2:
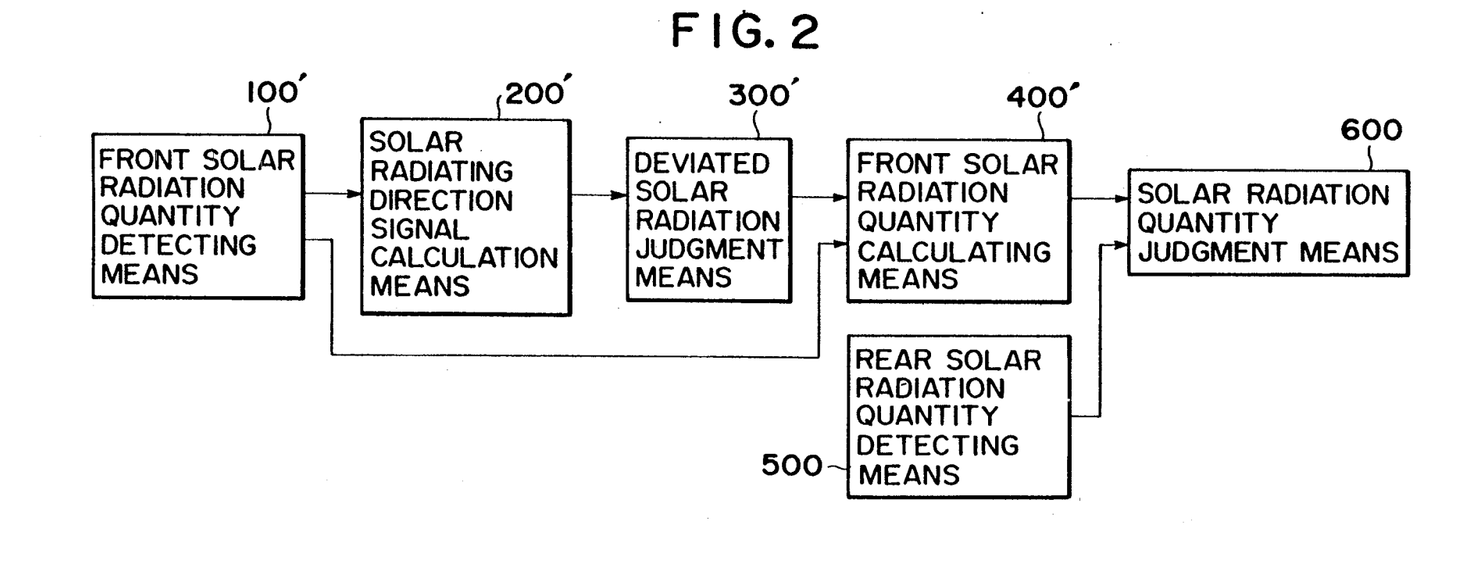
FIG. 2 is a block diagram showing the general construction of a solar radiation quantity detecting device provided according to a second aspect of the present invention.

FIG. 2 shows a solar radiation quantity detecting device provided by a second aspect of the present invention. The device generally comprises front solar radiation quantity detecting means 100' including at least two photoelectric transducer elements disposed adjacent to the windshield of an automobile for detecting quantities of solar radiation coming into a passenger compartment of an automobile, solar radiating direction signal calculation means 200' for calculating a solar radiating direction signal based on detected values from said front solar radiation quantity detecting means 100', deviated solar radiation judgment means 300' for judging of the solar radiating direction signal from said solar radiating direction signal calculation means 200' to be exceeding a predetermined level, solar radiation quantity calculating means 400' for calculating a solar radiating quantity based on a first solar radiation quantity characteristic determined based on the composite of a plurality of detected signals from said front solar radiation quantity detecting means 100' when the judgment of said deviated solar radiation judgment means 300' indicates the absence of a deviated solar radiation, and for calculating the solar radiating quantity based on a second solar radiation quantity characteristic determined by adding a correction to a solar radiation quantity obtained from the composite of said plurality of detected signals from said front solar radiation quantity detecting means 100' when the judgment of said deviated solar radiation judgment means 300' indicates the presence of a deviated solar radiation; rear solar radiation quantity detecting means 500 including a photoelectric transducer element disposed adjacent to the rear window of the automobile for detecting the quantity of solar radiation of the sunlight coming into the passenger compartment from the rear side of the automobile, and solar radiation quantity judgment means 600 for comparing the rear side solar radiation quantity from said rear solar radiation quantity detecting means 500 and the front side solar radiation quantity from said front solar radiation quantity detecting means 100' so as to judge a larger one of the front and rear solar radiating quantities to be a solar radiation quantity of the automobile.

The device is substantially the same as the device of the foregoing embodiment shown in FIG. 1 except for a rear solar radiation sensor 60 is disposed in the passenger compartment 47 adjacent to a rear window of the automobile, as shown in FIG. 4. With the rear solar radiation sensor 60 thus provided, the solar radiation quantity used for the control of the automobile air-conditioner is determined depending on the relationship between the front solar radiation sensor 42 and the rear solar radiation sensor 60.

Figure 10:
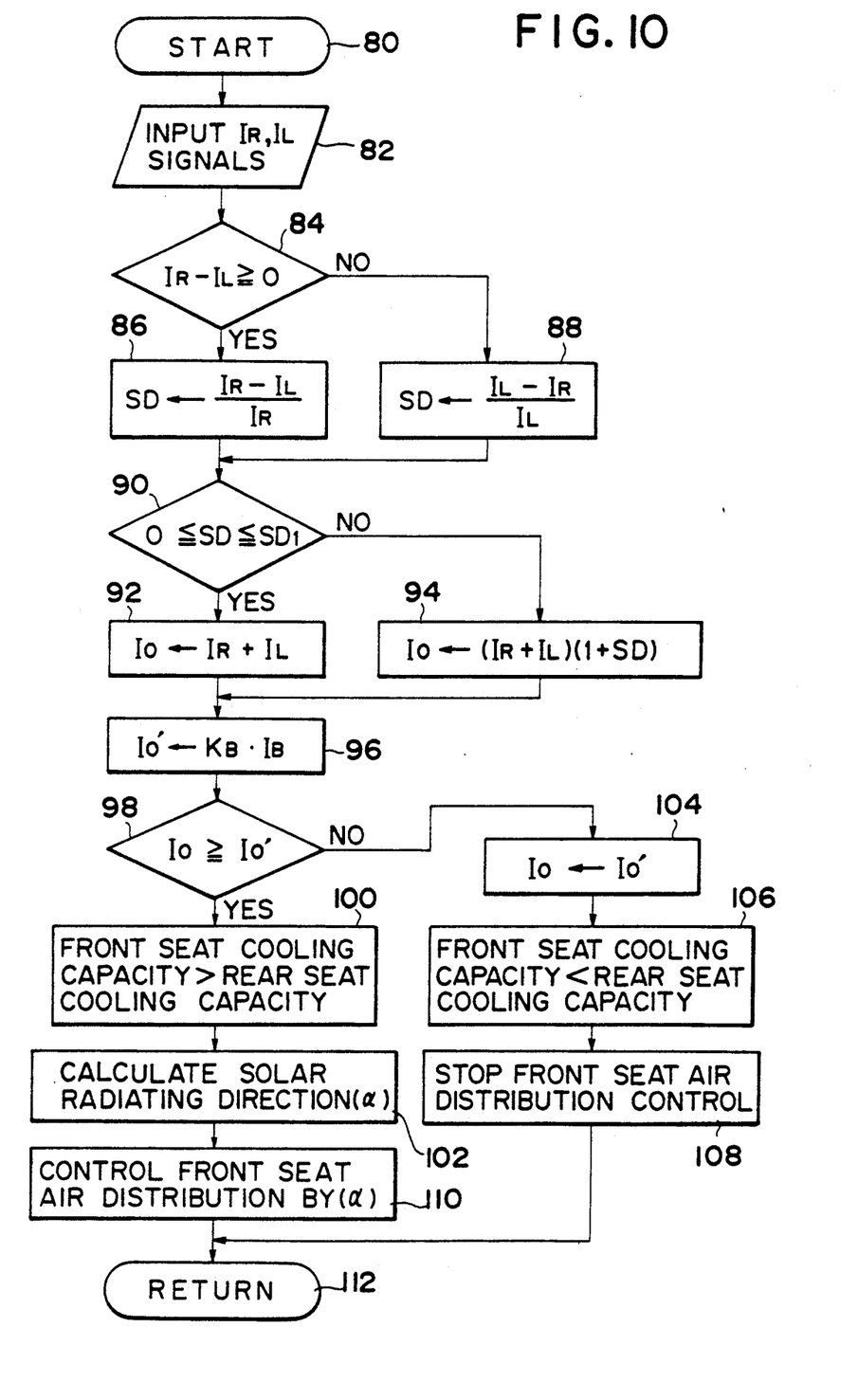
FIG. 10 is a flowchart showing a routine achieved by the microcomputer for calculating a second solar radiation quantity.
Figure 11:
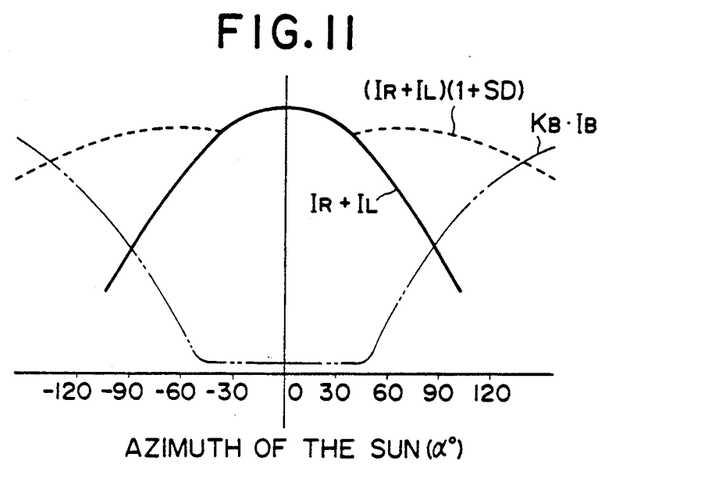
FIG. 11 is a graph showing a second solar radiation quantity characteristic curve.

Operation of the microcomputer incorporated in the control unit 11 will be described with reference to a flowchart shown in FIG. 10 The flowchart illustrates a control routine achieved for calculating a second solar radiation quantity.

Figure 7:
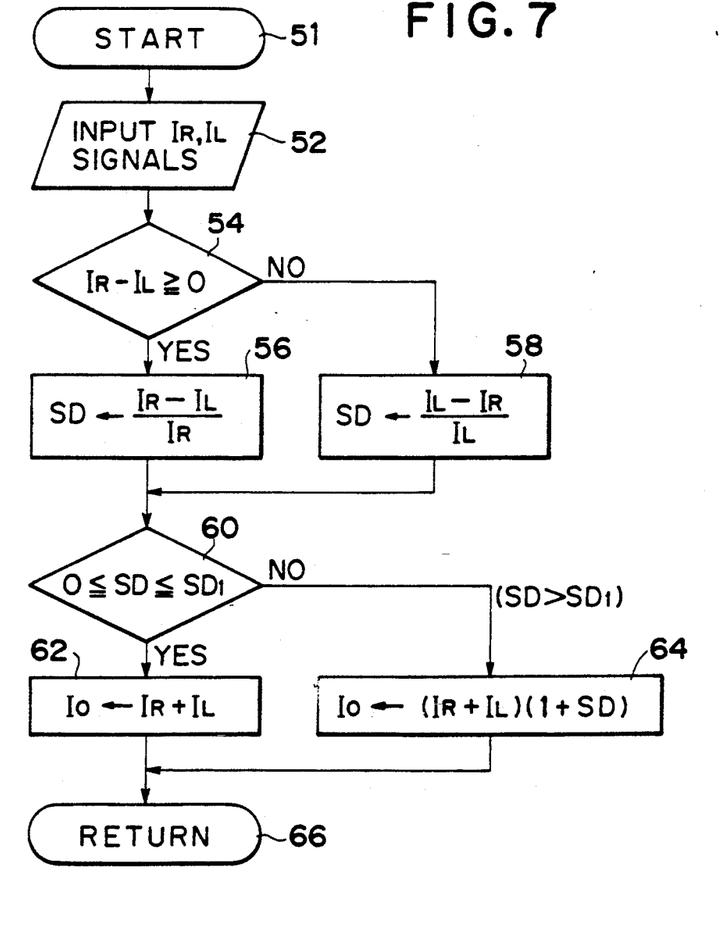
FIG. 7 is a flowchart showing a routine achieved by a microcomputer incorporated in the solar radiation quantity detecting device for calculating a first solar radiation quantity.

A step 80 starts the control routine and the succeeding steps 82 through 94 calculate the quantity $I_O$ of front solar radiation in the same manner as done in the embodiment shown in FIG. 7. Thereafter, a step 96 substitutes the rear solar radiation quantity $I_O'$ by a value obtained by using an expression $I_O' = K_B \cdot I_B$ where $K_B$ is a constant and $I_B$ is a detected value from the rear solar radiation sensor 60. Then, the control advances to a step 98 to compare the front solar radiation quantity $I_O$ calculated by the step 92 or step 94 with the rear solar radiation quantity $I_O'$ calculated in the preceding step 96. If $I_O \geq I_O'$, the front solar radiation quantity $I_O$ is used and control advances to a step 100 to make the cooling capacity for the front seat side to exceed the cooling capacity for the rear seat side. Thereafter, the control advances to a step 102 to perform a subroutine for calculating the solar radiating direction. Conversely, if $I_O < I_O'$ in the step 98, this means that the rear solar radiation quantity $I_O'$ is larger than the front solar radiation quantity $I_O$. Then the control goes on to a step 104 to substitute the front solar radiation quantity $I_O$ by the rear solar radiation quantity $I_O'$. Subsequently, the control advances to a step 106 to increase the rear seat cooling capacity to such an extent to exceed the front seat cooling capacity. Thereafter, a step 108 stops operation for controlling air distribution to the front seat, and the control advances to a step 112 from which the control returns to the main routine. The solar radiating direction calculation routine (described later) achieved in the step 102 calculates the solar radiating direction or azimuth $\alpha$ of the sun peculiar to the front seat portion based on the output values $I_R$, $I_L$ from the right and left light-receiving elements 46R, 46L of the front solar radiation sensor 42. Subsequently, the control advances to a step 110 to control the air distribution to the right and left portions in the vicinity of the front seat according to the azimuth $\alpha$ calculated in the step 102 in a manner described later.

Figure 12:
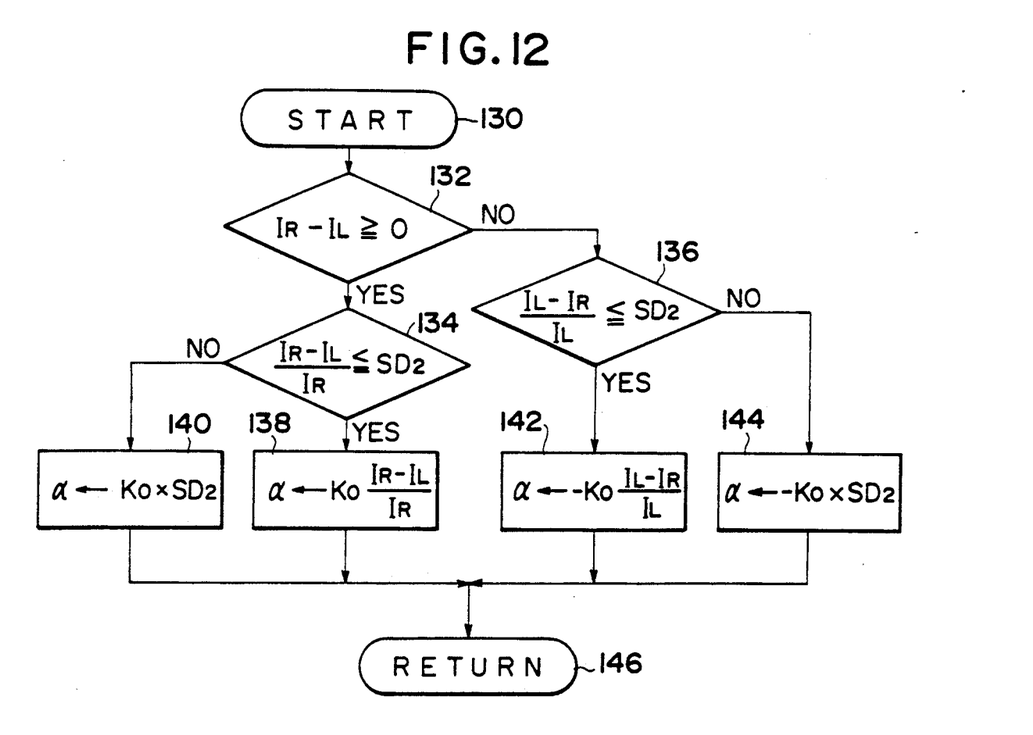
FIG. 12 is a flowchart showing a routine achieved by the microcomputer for calculating the solar radiation quantity.

FIG. 12 is a flowchart showing a control routine for calculating the azimuth which is performed in the second embodiment just described above.

A step 130 starts the control routine and in the next following step 132 compares the output value $I_R$ from the right light-receiving element 46R of the front solar radiation sensor 42 with the output value $I_L$ from the left light-receiving element 46L so as to judge of which of the right side solar radiation quantity and the left side solar radiation quantity is greater. If $I_R - I_L \geq 0$, this means that the output $I_R$ from the right light-receiving element 46R of the solar radiation sensor 42 is larger than or equal to the output $I_L$ from the left light-receiving element 46L of the solar radiating sensor 42 (i.e., the solar radiation quantity at the right side of the passenger compartment is larger than or equal to that at the left side of the passenger compartment). Then, the control advances to a step 134. Conversely, if $I_R - I_L < 0$, this means that the output $I_L$ from the left light-receiving element 46L is larger than the output $R_R$ from the right light-receiving element 46R (i.e., the solar radiation quantity at the left side of the passenger compartment is larger than the solar radiation quantity at the right side of the passenger compartment). In this case, the control goes on to a step 136. The step 134 compares the solar radiating direction standard value SD with a deviated solar radiation standard value $SD_2$ (a standard value used in the event of deviated solar radiation and to an angle of 60 degrees as shown in FIG. 8, for example), thereby judging of the current solar radiation coming from the right to be the deviated solar radiation. If $(I_R - I_L)/I_R \leq SD_2$, it is judged that the deviated solar radiation is not present. Then the control advances to a step 138. Conversely, if $(I_R - I_L)/I_R > SD_2$, it is judged that the current solar radiation is the deviated solar radiation. In this case, the control goes on to a step 140. The step 138 substitutes the azimuth $\alpha$ by $K_O(I_R - I_L)/I_R$ value which is obtained by multiplying the solar radiating direction standard value SD by a constant $K_O$ (where $K_O$ is nearly equal to 100). Then the control advances to a step 146. The step 140 substitutes the azimuth $\alpha$ by $K_O SD_2$ value based on the deviated solar radiation standard value $SD_2$ (where $K_O$ is a constant and nearly equal to 100 and hence $K_0 SD2 = 60$). Thereafter, the control advances to the step 146. Thus, the azimuth $\alpha$ is always set to an angle of 60 degrees when the direction of solar radiation is deviated from the direction of travel of the automobile to the right of the automobile. On the other hand, the step 136 judges of the current solar radiation from the left of the automobile is to be the deviated solar radiation in a manner similar to the judgment made in the step 134. If $(I_L-I_R)/I_L \leq SD_1$, this means that the deviated solar radiation is not present. In this instance, the control advance to a step 142. Conversely, if $(I_L-I_R)/I_L > SD_1$, this means that the current solar radiation is the deviated solar radiation. In this case, the control goes on to a step 144. The step 142 substitutes the azimuth by $-K_0(I_L-I_R)/I_L$ value which is obtained by multiplying the solar radiating direction standard value SD by a constant $K_O$ (where $K_O$ is nearly equal to 100). Then the control advances to the step 146. The step 144 substitutes the azimuth α by $-K_0SD_2$ value based on the deviated solar radiation standard value $SD_2$ (where $K_0SD_2$ is nearly equal to 60). Thereafter, the control goes on to the step 146. Thus, the azimuth α is always set to an angle of −60 degrees when the direction of solar radiation is deviated from the direction of travel of the automobile to the left of the automobile.

Obviously, various minor changes and modifications of the present invention are possible in the light of the above teaching. It is therefore to be understood that within the scope of the appended claims the invention may be practiced otherwise than as specifically described.

What is claimed is:

1. A device for detecting the quantity of solar radiation for use in an automobile air-conditioner, comprising:
   (a) solar radiation quantity detecting means including at least two photoelectric transducer elements for detecting quantities of solar radiation coming into a passenger compartment of an automobile;
   (b) solar radiating direction signal calculation means for calculating a solar radiating direction signal based on a plurality of detected values from said solar radiation quantity detecting means;
   (c) deviated solar radiation judgment means for judging of the solar radiating direction signal from said solar radiating direction signal calculation means to be exceeding a predetermined level; and
   (d) solar radiation quantity calculating means for calculating a solar radiating quantity based on a first solar radiation quantity characteristic determined based on the composite of said plurality of detected signals from said solar radiation quantity detecting means when the judgment of said deviated solar radiation judgment means indicates the absence of a deviated solar radiation, and for calculating the solar radiating quantity based on a second solar radiation quantity characteristic determined by adding a correction to a solar radiation quantity obtained from the composite of said plurality of detected signals from said solar radiation quantity detecting means when the judgment of said deviated solar radiation judgment means indicates the presence of a deviated solar radiation.

2. A device according to claim 1 wherein said at least two photoelectric transducer elements are disposed on two inclined surfaces of a sensor base, said sensor base being tilted down toward the direction of travel of the automobile at a predetermined angle, said inclined surfaces sloping down to the right and left of the automobile.

3. A device according to claim 1 wherein said solar radiating direction signal is calculated by dividing the difference between a larger one of the right and left solar radiation quantities and the smaller solar radiation quantity by said larger solar radiation quantity 4. A device according to claim 1 wherein the solar radiation quantity calculated by said solar radiation quantity calculating means in the absence of the deviated solar radiation is equal to the sum of the quantity of solar radiation on the right side of the automobile and the quantity of solar radiation on the left side of the automobile.

5. A device according to claim 1 wherein in the presence of the deviated solar radiation, the solar radiation quantity calculated by said solar radiation quantity calculating means is equal to a value obtained by multiplying the sum of the quantity of solar radiation on the right side of the automobile and the quantity of solar radiation on the left side of the automobile by the su of said solar radiating direction signal and 1.

6. A device for detecting the quantity of solar radiation for use in an automobile air-conditioner, comprising:
   (a) front solar radiation quantity detecting means including at least two photoelectric transducer elements disposed adjacent to the windshield of an automobile for detecting quantities of solar radiation coming into a passenger compartment of an automobile;
   (b) solar radiating direction signal calculation means for calculating a solar radiating direction signal based on detected values from said front solar radiation quantity detecting means;
   (c) deviated solar radiation judgment means for judging of the solar radiating direction signal from said solar radiating direction signal calculation means to be exceeding a predetermined level;
   (d) solar radiation quantity calculating means for calculating a solar radiating quantity based on a first solar radiation quantity characteristic determined based on the composite of a plurality of detected signals from said front solar radiation quantity detecting means when the judgment of said deviated solar radiation judgment means indicates the absence of a deviated solar radiation, and for calculating the solar radiating quantity based on a second solar radiation quantity characteristic determined by adding a correction to a solar radiation quantity obtained from the composite of said plurality of detected signals from said front solar radiation quantity detecting means when the judgment of said deviated solar radiation judgment means indicates the presence of a deviated solar radiation;
   (e) rear solar radiation quantity detecting means including a photoelectric transducer element disposed adjacent to the rear window of the automobile for detecting the quantity of solar radiation of the sunlight coming into the passenger compartment from the rear side of the automobile; and
   (f) solar radiation quantity judgment means for comparing the rear side solar radiation quantity from said rear solar radiation quantity detecting means and the front side solar radiation quantity from said front solar radiation quantity detecting means so as to judge a larger one of the front and rear solar radiating quantities to be a solar radiation quantity of the automobile.

7. A device according to claim 6 wherein said at least two photoelectric transducer elements are disposed on two inclined surfaces of a sensor base, said sensor base being tilted down toward the direction of travel of the automobile at a predetermined angle, said inclined surfaces sloping down to the right and left of the automobile.

8. A device according to claim 6 wherein said solar radiating direction signal is calculated by dividing the difference between a larger one of the right and left solar radiation quantities and the smaller solar radiation quantity by said larger solar radiation quantity.

9. A device according to claim 6 wherein the solar radiation quantity calculated by said solar radiation quantity calculating means in the absence of the deviated solar radiation is equal to the sum of the quantity of solar radiation on the right side of the automobile and the quantity of solar radiation on the left side of the automobile.

10. A device according to claim 6 wherein in the presence of the deviated solar radiation, the solar radiation quantity calculated by said solar radiation quantity calculating means is equal to a value obtained by multiplying the sum of the quantity of solar radiation on the right side of the automobile and the quantity of solar radiation on the left side of the automobile by the sum of said solar radiating direction signal and 1.

* * * * *